United States Patent
Bassinger et al.

[19]

[11] Patent Number: 5,803,169
[45] Date of Patent: Sep. 8, 1998

[54] ROTARY STUFFING BOX AND SEAL ASSEMBLY

[75] Inventors: Grey Bassinger, Midland; Joseph L. Dalton, Odessa, both of Tex.

[73] Assignee: Auto Pax Products, L.L.C., Odessa, Tex.

[21] Appl. No.: 772,948

[22] Filed: Dec. 24, 1996

[51] Int. Cl.⁶ .................................................. E21B 33/02
[52] U.S. Cl. ............................................................ 166/84.1
[58] Field of Search ................................ 166/84.1–84.4; 277/165, 133

[56] References Cited

U.S. PATENT DOCUMENTS

| | | | |
|---|---|---|---|
| 1,911,670 | 5/1933 | Black . | |
| 1,947,198 | 2/1934 | Goble | 238/16 |
| 2,069,443 | 8/1937 | Hill | 286/15 |
| 2,159,306 | 2/1939 | Winters | 286/15 |
| 2,179,814 | 5/1939 | Conaghan | 166/14 |
| 2,182,246 | 12/1939 | Boyer et al. | 286/15 |
| 2,674,474 | 5/1954 | Lister | 286/27 |
| 2,721,748 | 2/1955 | Tremolada | 286/15 |
| 3,244,424 | 4/1966 | Cope | 277/4 |
| 3,512,787 | 5/1970 | Kennedy et al. | 277/4 |
| 3,675,933 | 7/1972 | Nappe | 277/9 |
| 3,880,433 | 4/1975 | Nau | 277/17 X |
| 3,886,804 | 6/1975 | Winfield, Jr. | 74/18.2 |
| 3,887,196 | 6/1975 | Renfrow | 277/2 |
| 3,967,678 | 7/1976 | Blackwell | 166/53 |
| 4,008,897 | 2/1977 | Wentworth | 277/9 |
| 4,099,562 | 7/1978 | Mattoon | 166/84 |
| 4,342,461 | 8/1982 | Lindsay | 277/30 |
| 4,345,766 | 8/1982 | Turanyi | 277/30 |
| 4,490,097 | 12/1984 | Gilbertson | 417/401 |
| 4,530,397 | 7/1985 | Calhoun | 166/84 |
| 4,560,176 | 12/1985 | Hoff | 277/105 |
| 4,647,050 | 3/1987 | Johnson | 277/19 |
| 4,889,184 | 12/1989 | Lugtmeier et al. | 166/80 |
| 4,896,367 | 1/1990 | Newton et al. | 384/16 |
| 4,981,174 | 1/1991 | White | 166/84 |
| 5,058,668 | 10/1991 | Newton | 166/84 |
| 5,137,083 | 8/1992 | Bump | 166/84 |
| 5,217,068 | 6/1993 | Newton | 166/84 |
| 5,343,944 | 9/1994 | Bassinger | 166/84 |
| 5,344,163 | 9/1994 | Roll et al. | 277/133 X |
| 5,538,080 | 7/1996 | Bassinger | 166/84.2 |

Primary Examiner—Roger J. Schoeppel
Attorney, Agent, or Firm—Akin, Gump, Strauss, Hauer & Feld, L.L.P.

[57] ABSTRACT

A rotary stuffing box assembly, particularly adapted to form a rotary shaft seal for a downhole well pump includes a housing mountable on the upper end of the well tubing or other support structure and a cover threadedly connected to the housing and forming a closed chamber in the housing for holding a quantity of seal lubricant and/or coolant fluid. A resilient rotary shaft seal element is retained in a seal holder within the housing by an axially split seal retainer which is mountable in a bore in the seal holder. The retainer and the seal holder are retained between opposed transverse faces on the cover and on the housing and the seal holder engages a retaining pin on a threaded plug which closes a fluid drain port of the housing. The seal holder and retainer are operable to undergo limited radial excursion to accommodate eccentricity or excursion of the shaft. Spare seal elements may be carried on the shaft adjacent to the cover and the shaft may have a replaceable and adjustable hard faced sleeve defining a seal element engaging surface. The seal element may be changed without disconnecting or removing a pump drive structure from the shaft or removing the stuffing box from its support structure.

29 Claims, 4 Drawing Sheets

ROTARY STUFFING BOX AND SEAL ASSEMBLY

FIELD OF THE INVENTION

The present invention pertains to a stuffing box and seal assembly for a rotating shaft, particularly a vertically oriented shaft driving a submersible pump and the like.

BACKGROUND

Heavy duty rotary shaft seals and associated structure are relatively highly developed mechanical devices. However, there are many applications of seals for rotary shafts which require or desirably should have means to replace the seal element without major disassembly of the associated equipment or supporting structure for the seal. There are also many applications for rotary shaft seals which desirably should allow for some eccentric or orbital motion of the shaft with respect to a nominal shaft axis of rotation while still providing a fluid-tight seal.

One example of a difficult operating environment for a rotary shaft seal and stuffing box structure is with regard to a shaft seal for a downhole well pump wherein the pump drive motor is located at the surface and drives the pump mechanism through an elongated rotary shaft. In such an arrangement a seal is provided at the upper end of the pump support casing and fluid discharge conduit and between the pump and the pump drive motor. The extensive length of drive shafting for this type of pump can often result in lateral excursion of the shaft. Accordingly, some difficulty in maintaining a seal for the pump drive shaft at the upper end of the fluid discharge conduit is usually encountered.

Moreover, it is desirable to be able to replace worn seal elements in such an arrangement without disassembly or removal of the pump motor from its connection to the drive shaft. A rotary seal and stuffing box arrangement for such an application should also have a source of seal lubricant/coolant to maximize seal working life. The desiderata for rotary stuffing box and seal assemblies mentioned above as well as certain other features for a rotary shaft seal and stuffing box assembly which are desirable will be further appreciated by those skilled in the art from reading the following summary and detailed description.

SUMMARY OF THE INVENTION

The present invention provides an improved stuffing box and seal assembly for providing a substantially fluid-tight seal for a rotating shaft. The present invention also provides an improved seal assembly, particularly adapted for sealing a rotating shaft for a downhole well pump or similar apparatus.

In accordance with one aspect of the present invention a rotary stuffing box and shaft seal assembly is provided wherein a resilient seal member is supported for sealing engagement with a rotating shaft while allowing some lateral or orbital excursion of the shaft with respect to a nominal central axis of rotation of the shaft and the central axis of the stuffing box. The stuffing box includes a housing and removable cover which, in combination, support a seal holder and seal spacer and retainer member in such a way that the seal is allowed to undergo some lateral excursion with respect to the stuffing box to accommodate the shaft lateral excursion and/or eccentricity.

In accordance with another aspect of the present invention a stuffing box and seal assembly is provided wherein a resilient annular seal element may be easily replaced with a spare annular seal element without removing the stuffing box from its support and without disconnecting the shaft from a driving or driven member, respectively. The resilient seal element is retained in its working position by a generally cylindrical, axially split seal retainer and spacer member which is held in its working position by a removable cover of the stuffing box. Upon disconnection of the cover from the stuffing box housing, the retainer-spacer may be removed to provide access to a worn or damaged seal element whereby the seal element may be cut away and replaced by a spare seal which is retained on the rotary shaft in a non-working position until needed.

In accordance with another aspect of the present invention a stuffing box and seal assembly is provided wherein one or more spare annular sealing elements may be stored on the rotating shaft either exterior of the stuffing box, within a protective hub portion of the stuffing box or within an annular cavity in a spacer and seal retainer member within the stuffing box assembly. The spare seal elements may serve as seal lubricant and coolant slinger ring type dams to prevent loss of seal lubricant to the exterior of the stuffing box assembly. Moreover, replaceable slinger rings may be stored on the shaft positioned between replacement shaft seal members for replacing a slinger ring which must be removed when a new shaft seal is installed in its working position.

In accordance with still another aspect of the present invention a stuffing box and seal assembly is provided which includes a reservoir for holding a quantity of seal lubricant/coolant and a seal holder member is supported within the stuffing box housing in such a way as to allow some lateral excursion of the seal holder while preventing all but very limited rotation of the seal holder by one or more combination reservoir drain plugs and retaining pins. The drain plug and retaining pin engages the seal holder to prevent its rotation but may be removed to drain seal lubricant/coolant from the stuffing box reservoir.

In accordance with yet a further aspect of the present invention a rotary shaft stuffing box and seal assembly is provided wherein a rotary shaft which is sealed by the assembly includes a liner or sleeve member which may be moved to selected positions when it becomes worn by the resilient sealing element so that a fresh unworn sealing surface is positioned to be engageable with the seal element.

The foregoing features and advantages of the invention together with other important aspects thereof will be further appreciated by those skilled in the art upon reading the detailed description which follows in conjunction with the drawing.

DESCRIPTION OF THE PREFERRED EMBODIMENTS

Figure 1:
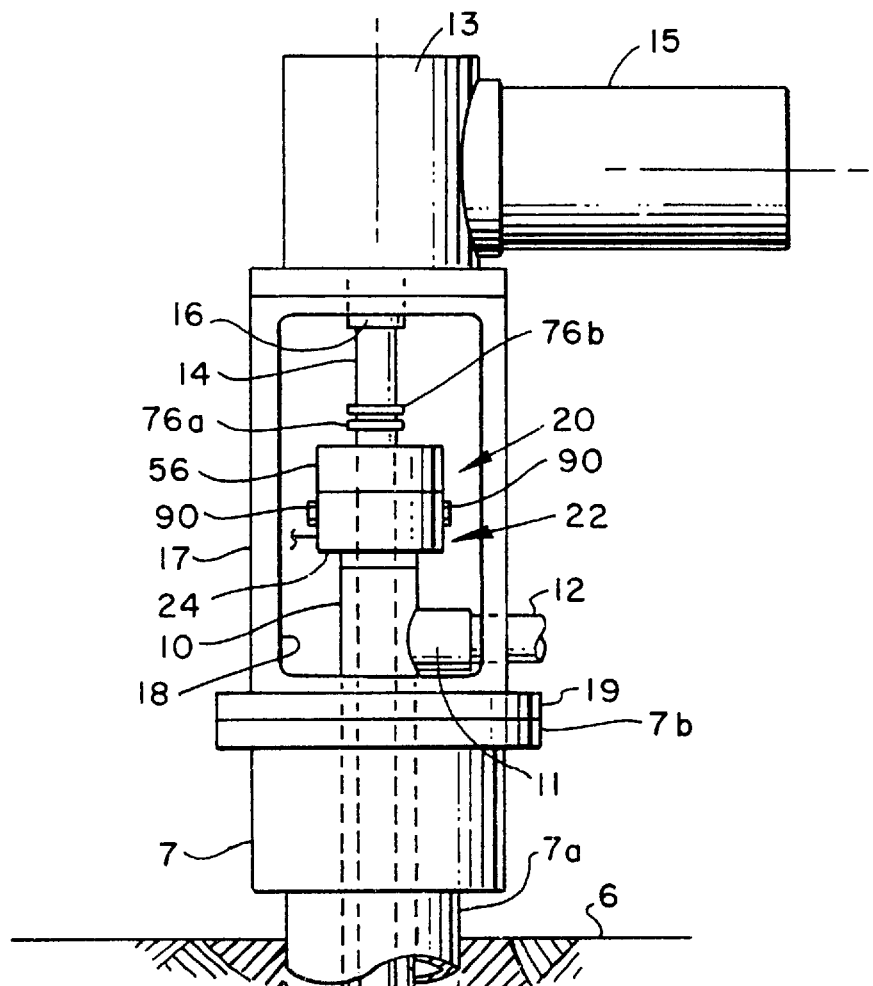
FIG. 1 is an elevation of a rotary shaft-driven downhole well pump including the rotary shaft stuffing box and seal assembly of the present invention.
Figure 1:
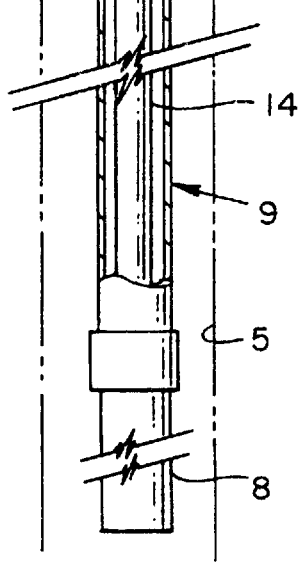

In the description which follows like parts or portions thereof are marked throughout the specification and drawing with the same reference numerals, respectively. The drawing figures are not necessarily to scale and certain features may be shown in generalized or somewhat schematic form in the interest of clarity and conciseness.

Referring to FIG. 1 there is illustrated a typical well 5 drilled into the Earth from the Earth's surface 6 and including a wellhead 7 including a surface casing 7a. The well 5 is equipped with a downhole rotary pump 8 which is supported within the well by an elongated fluid-conducting tubing string or conduit 9 which extends to the wellhead 7 and includes an upper end 10 having a fitting 11 connected to a fluid flow line 12. The pump 8, typically, is a progressive cavity or rotary screw, positive displacement type and is suitably connected to an elongated rotary shaft 14 extending through the tubing or conduit 9 to a point of connection with a drive mechanism 13 including a suitable drive motor 15. The upper end of shaft 14 extends from the distal end 10 of the tubing 9 and is suitably coupled to the drive mechanism 13 by coupling means 16. The drive mechanism 13, 15 is supported on the wellhead 7 by a suitable, generally cylindrical tubular support structure 17, for example, including one or more relatively large windows 18 formed therein and including at least one transverse flange 19 for supporting the structure on a cooperating flange 7b of the wellhead 7.

As further shown in FIG. 1, a unique rotary stuffing box and shaft seal assembly 20 is supported on the distal end 10 of the conduit 9 for sealing shaft 14 to prevent discharge of production fluid from the distal end of the conduit and which is being pumped by the pump 8 through the conduit. Although the stuffing box and seal assembly 20 is particularly adapted for sealing the shaft 14 of a rotary downhole well pump, those skilled in the art will recognize that certain other applications for the stuffing box and seal assembly 20 may enjoy the benefits thereof.

Figure 2:
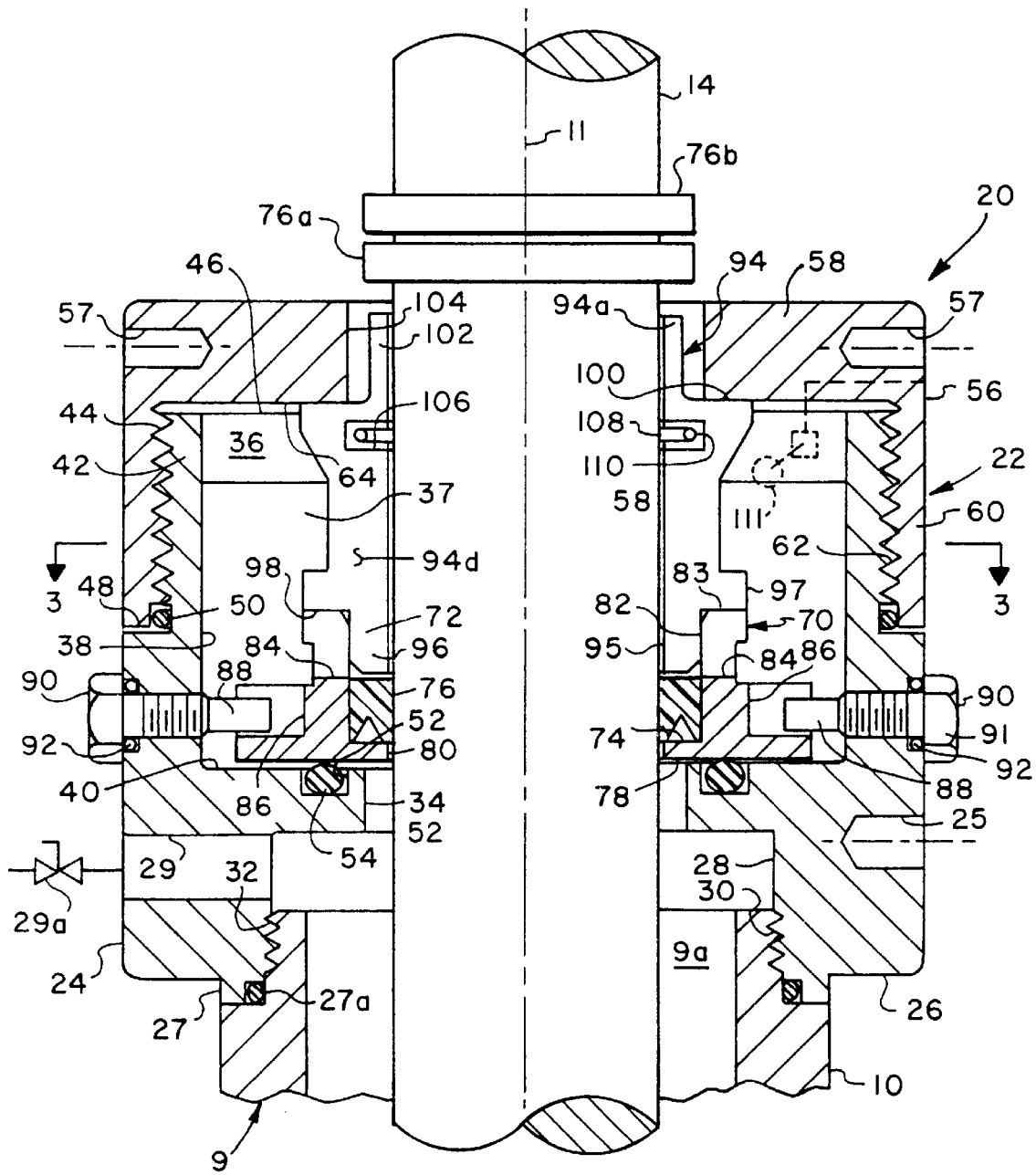
FIG. 2 is a vertical central section view through the stuffing box and seal assembly of the invention taken along a parting line between opposed seal retainer parts.

Referring now to FIG. 2, the stuffing box and seal assembly 20 is shown in longitudinal central section view and mounted on the conduit 9. The stuffing box and seal assembly 20 includes a generally cylindrical stuffing box 22 having a generally cylindrical lower housing 24. The housing 24 has a lower transverse end wall 26 with a central axial bore 28 formed therein and internally threaded at threads 30 for threadedly connecting the stuffing box to the conduit 9. Conduit 9 is provided with cooperating threads 32 on its upper distal end 10. The transverse end wall 26 may be provided with a suitable peripheral collar portion 27 forming a suitable counterbore for retaining a resilient seal member, such as an o-ring 27a, for sealing engagement between the housing 24 and the conduit 9 when they are threadedly connected to each other. Lower housing 24 also includes an axial bore 34 interconnecting the bore 28 with a chamber 36 formed by an axial bore 38 and which is delimited by a transverse surface or floor 40 of the lower housing. An upward, axially extending reduced diameter portion 42 of housing 24 is externally threaded at 44 between an upper distal end 46 and a transverse shoulder 48. An annular recess or o-ring groove is formed between the threads 44 and the shoulder 48 for supporting a suitable o-ring seal member 50. An annular recess or o-ring groove 52 in end wall 26 intersects the floor 40 and is operable to support an o-ring type resilient seal member 54 therein.

The stuffing box 22 also includes a generally cylindrical cover member 56 having a transverse end wall 58 and an axially extending cylindrical wall portion 60 which is internally threaded at 62 for threaded engagement with the housing 24 at its cooperating threads 44. A transverse roof surface 64 delimits the transverse end wall 58 and encloses the chamber 36 whereby the chamber may serve as a reservoir for a seal lubricant and/or coolant fluid indicated at 37 in FIG. 2. As shown in FIG. 2, the housing 24 and the cover member 56 are provided with one or more circumferentially spaced radially extending bores 25 and 57, respectively, for engagement of these members by suitable spanner wrenches, not shown. Housing 24 also includes a transverse passage 29 formed therein and opening into the bore 28 for conducting fluid from an interior space 9a at the upper end of conduit 9 and the space delimited by the bores 28 and 34 for a purpose to be described further herein. Passage 29 may be closed by a suitable valve 29a.

The stuffing box and seal assembly 20 is further characterized by a generally cylindrical seal holder 70 having an axial bore 72 formed therein which is delimited by a transverse shoulder 74 and forms a recess for supporting an annular resilient seal element 76. The seal element 76 may be formed of a suitable elastomeric material and be configured to be pressure set by fluid pressure in the space defined by the bores 28 and 34 when the seal element is in substantially fluid-tight sealing engagement with the shaft 14. The seal holder 70 includes a transverse, planar end face 78 which is disposed to be in engagement with the o-ring 54 to form a fluid-tight seal between the bore 34 and the reservoir chamber 36 while allowing some lateral excursion of the seal holder 70 with respect to a central axis 11 which is the nominal axis of rotation of the shaft 14 and is also the central axis of the stuffing box and seal assembly 20. The seal holder 70 also includes an axial bore 80 extending between the bore 72 and the end face 78 and being slightly larger than the diameter of the shaft 14.

The seal holder 70 is further defined by a flange portion 82 which defines the bore 72 and is delimited by a transverse end face 83. One or more axially extending relatively narrow slots 84 are formed in the flange portion 82 and open to the end face 83. The slots 84 are operable to communicate seal lubricant and coolant 37 from the reservoir chamber 36 to the resilient seal element 76 generally at its point of contact with the shaft 14. Two opposed slots 84 are shown and these slots are also operable to facilitate removal of a seal element 76 from the bore 72 when desired.

Figure 3:
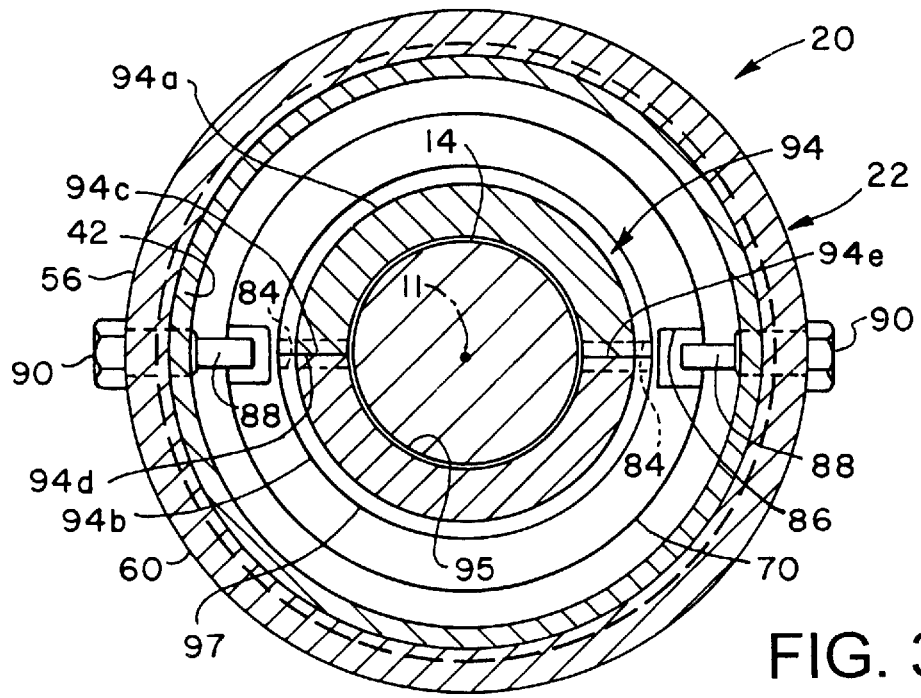
FIG. 3 is a section view taken along the line 3—3 of FIG. 2.

Referring further to FIGS. 2 and 3, the seal holder 70 is provided with two opposed, radially projecting slots 86 which are each operable to receive a distal key or retaining pin 88 part of a combination anti-rotation retainer for seal holder 70 and a drain plug 90. Each of the plugs 90 comprises a hexhead machine screw which is threadedly retained in a suitable radially extending threaded bore formed in the lower housing 24. An o-ring seal 92 is preferably retained under the head 91 of the plug 90 to form a fluid-tight seal between the plug and the lower housing 24. As will be noted in FIG. 3, each retaining pin 88 is a relatively loose fit in the slot 86 to facilitate alignment when inserting the plugs 90 into the bore in the housing 24 but the combination retaining pin and plug 90 substantially prevents rotation of the seal holder 70 with respect to the housing 24. Two plugs 90 are provided so that seal holder 70 is prevented from rotation or being lifted on shaft 14 when one plug is removed to drain fluid from chamber 36 and a seal element 76 is being lifted out of bore 84 by a seal pick, not shown.

Referring further to FIGS. 2 and 3, the stuffing box and seal assembly 20 also includes a generally cylindrical, axially split, multi part seal spacer and retainer member, generally designated by the numeral 94. The retainer member 94 is split along a parting line 94c, FIG. 3, to form two identical, axially split halves or parts 94a and 94b which have opposed, planar mating surfaces 94d and 94e, respectively. The parts 94a and 94b, when assembled in the position shown in FIGS. 2 and 3, form a bore 95 of larger diameter than the diameter of shaft 14, and a reduced diameter cylindrical hub 96 which is dimensioned to fit snugly within the bore 72 to retain the resilient seal element 76 therein. A transverse annular shoulder 98 is formed on the retainer 94 and is engageable with the face 83 of the flange 82 to retain the seal holder 70 in its working position and to bias the seal holder into forcible engagement with the resilient o-ring 54 when the cover 56 is threaded into full engagement with the housing 24. In this regard, the retainer 94 includes a transverse annular shoulder 100 spaced from and opposed to the shoulder 98 and engageable with roof 64 of the cover 56. A reduced diameter collar portion 102 on retainer 94 projects into a bore 104 formed in the end wall 58 of the cover 56. The bore 104 has a diameter at least slightly greater than the diameter of seal element 76. The retainer and spacer member 94 may be formed of more than two, axially split, separate parts, although only two identical halves as described are preferred.

The spacer and retainer member 94 also includes an annular recess 106 formed therein to provide clearance for a suitable seal lubricant and coolant dam comprising an annular slinger 108 sleeved over the shaft 14 in the position shown in FIG. 2. The slinger 108 may, for example, comprise a radially split circular ring having a suitable removable retaining member, such as a garter spring 110, snugly fitted around the periphery of the two parts of the slinger 108. Alternatively, the slinger may be a resilient, elastically stretchable ring member or an annular member or members arranged as described herein in conjunction with FIGS. 4 and 5. Other means may be provided for minimizing the flow of seal lubricant and/or coolant fluid up the shaft 14 within the bore 95.

The parts of the stuffing box and seal assembly 20 are dimensioned such that, when the seal element 76 is disposed in the bore 72 and the retainer 94 is assembled and also disposed in the bore 72 the shoulder 98 will engage face 83 before the distal end hub part 96 of the spacer 94 engages the seal element with substantial force. Moreover, the retainer 94 and the seal holder 70 are also dimensioned such that when the cover 56 is tightly threadedly engaged with the housing 24 the roof 64 will engage the shoulder 100 and sufficient pressure will be applied to deflect the o-ring 54 but the cover 56 will also engage the transverse face 48 before the surface 78 engages the floor 40. In this way the seal holder 70 and the retainer 94 may be snugly retained in the stuffing box 22 but allowed to translate radially with respect to the axis 11 as delimited only by engagement of the distal end portion 102 with the portion of the wall 58 defining the bore 104. Accordingly, the seal element 76 is allowed to translate radially with the shaft 14 as a result of any eccentricity in the shaft or deflection thereof during operation. The faces or surfaces 40 and 78 may be allowed to engage but not forcibly to the extent that the holder 70 is clamped against freedom to move radially. The seal support groove 52 may be formed in holder 70, if desired.

When the stuffing box assembly 20 is placed in operation the chamber 36 is filled to a suitable level with a seal element coolant and lubricant 37. Since fluid discharged from pump 8 will flow up through the interior of conduit 9 into the space defined by the bores 28 and 34 any air trapped in these spaces may be bled off through the passage 29 and the valve 29a so that the aforementioned spaces will fill completely with pumped liquid to provide some cooling effect for the seal element 76. If fluid leakage should occur through the seal element 76 from conduit 9, the fluid level in the chamber 36 will increase as fluid flows into the chamber through the passages 84, for example, or past the o-ring seal member 54. This increase in fluid level may be detected by suitable sensor means, such as a float switch 111, FIG. 2, or other sensor means operable to sense the fluid level in the chamber 36. Fluid leakage past the seal element 76 may be detected by merely observing fluid leaking from the stuffing box 22 and which is flowing through the bore 104 as the chamber 36 overfills.

As shown in FIG. 2, one or more spare seal elements 76a and 76b may be stored on the shaft 14 in the position shown, for example. When it is necessary or desirable to replace the seal element 76, the cover 56 is disengaged from the lower housing 24 and moved upwardly on the shaft and suitably retained thereon out of the way during the seal element replacement process. Seal lubricant 37 is preferably drained from the chamber 36 by removal of one of the plugs 90 and discarded or retained in a container for reuse, if desired. The axially split spacer and retainer member 94 is then moved upward out of the bore 72 and the retainer halves 94a and 94b removed from the shaft 14 and set aside. The split ring oil slinger 108 is also then removed from the shaft 14 by stretching the garter spring 110 to disengage it from the opposed ring parts and moving the spring to an out-of-the-way position on shaft 14, and then removing the opposed ring parts from the shaft. The worn seal element 76 may then be removed from its holder 70 by a suitable tool which can be used to extend through a slot 84 to pry the seal element out of the holder and the seal element is then cut off of the shaft using a suitable cutting tool.

A replacement seal element, such as seal element 76a, is then moved slidably down the shaft 14 into the bore 72 to its working position in the seal holder 70. The split ring oil slinger 108 is then returned to its working position and the retainer 94 is reassembled into its working position shown in FIG. 2. The chamber 36 is, of course, preferably cleaned, as well as the surface of the shaft 14, before replacement of the seal element 76 with the seal element 76a and reassembly of the retainer 94 to its working position. A suitable quantity of seal lubricant 37 is then placed in the chamber 36 after replacement of the plug 90 with its retaining pin 88 engaged with the holder 70 at the slot 86. The cover 56 is then replaced on the lower housing 24 and threadedly engaged therewith until the cover engages the face 48.

Those skilled in the art will recognize that the bores 34, 80, and 95 are suitably dimensioned such that the housing 24, the seal holder 70 and the retainer 94 do not engage the shaft 14 and only the inner circumferential surfaces of the seal element 76 are in engagement with the shaft. As mentioned previously, radial or lateral excursion of the seal holder 70 and the retainer 94 are limited by engagement of the distal portion 102 of the retainer with the cover 56 at the bore 104. When seal element 76a becomes worn, the above-mentioned process can be repeated to install seal element 76b.

Figure 4:
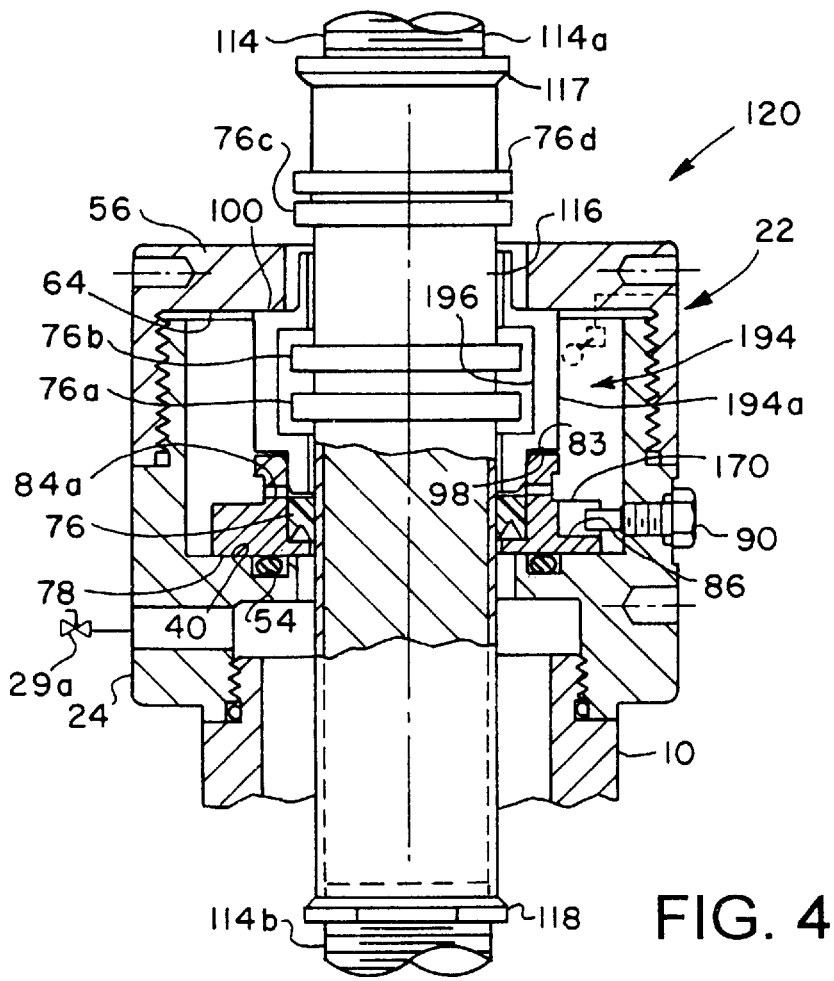
FIG. 4 is a section view similar to FIG. 2 showing one modification of the rotary shaft to include a replaceable sleeve or liner and a modification of a seal retainer to provide for spare seal element storage.

Referring to FIG. 4, a stuffing box and seal assembly 120, similar in many respects to the assembly 20, may also be operated in conjunction with a rotary shaft 114 which is modified to have a replaceable liner or sleeve 116 disposed thereon and adjustably positioned on the shaft between opposed retainers 117 and 118, respectively. As shown in FIG. 4, the shaft 114 may be modified to have spaced apart threaded portions 114a and 114b and the retainers 117 and 118 comprise nuts or threaded collars threadedly engaged with the threaded portions, 114a and 114b, respectively. In this way the position of the hard surfaced liner or sleeve 116 may be adjusted with respect to the location of a seal element 76. In this way also, if the seal engaging surface of the shaft provided by the circumferential surface of sleeve 116 should become worn or damaged, the sleeve may be moved axially with respect to the normal working position of the seal element 76 so that an unworn surface of the sleeve is engageable with the seal element. Access to retainer 118 would normally require removal of stuffing box 22 from the conduit 9.

Referring further to FIG. 4, the stuffing box and seal assembly 120 is illustrated in operative position disposed on the conduit 10 and includes a housing 24, a cover 56, and a seal holder 170 for holding a seal element 76, or a replacement seal element, in a working position. However, in the stuffing box and seal assembly 120 the retainer 94 has been replaced by a retainer 194 modified to include opposed retainer half parts, including part 194a, as shown in FIG. 4, which is modified to have an enlarged annular cavity 196 formed therein permitting storage of spare seal elements 76a and 76b within the stuffing box 22, as shown.

Moreover, the location of the seal elements 76a and 76b stored on the rotary liner 116 within the retainer 194 serves as a slinger type dam to minimize flow of seal lubricant and coolant 37 out of the stuffing box along the surface of the liner 116. In other words, the seal elements 76a and 76b serve as slingers to replace the slinger ring assembly 108, 110 described above for the stuffing box and seal assembly 20. The retainer 194 includes opposed surfaces 98 and 100 for engaging the seal holder 170 and the roof 64 of the cover 56 in the same manner as the retainer 94 operates in conjunction with the embodiment shown in FIGS. 2 and 3. Additional seal elements 76c and 76d may be stored on the liner 116 exterior of the stuffing box 22. Stuffing box and seal assembly 120 may be disassembled and reassembled in substantially the same manner as the assembly 20 for replacing a worn seal element with one of the spare elements shown.

In accordance with conventional practice, the shaft 14 and the sleeve 116 are preferably provided with a suitable hard surface ground and polished to a very smooth finish so that the seal element 76 will not tend to wear out or wear the shaft or the sleeve rapidly. However, conventional materials used for rotary shafting and seal elements normally experience some wear on the shaft or liner over time. In the embodiment shown in FIG. 4 the seal holder 170 is also modified slightly to include opposed passages 84a in place of the slots 84 and only one drain plug and retaining key 88, 90 is provided in housing 24 for projection into a single slot 86.

Figure 5:
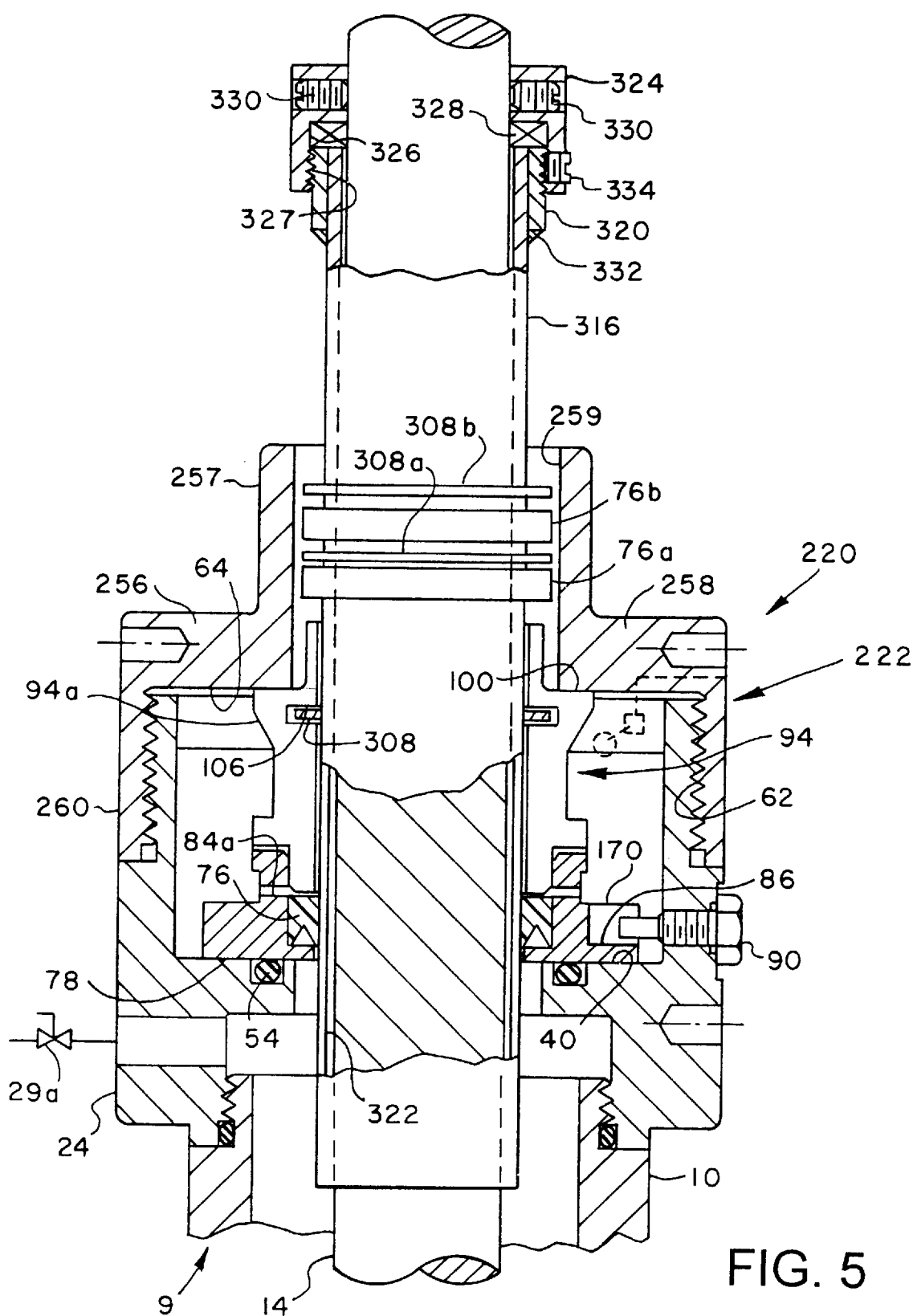
FIG. 5 is a central section view similar to FIG. 2 showing another modification of a stuffing box and seal assembly including a modified liner or sleeve and a modified housing cover for storing spare seal elements.

Referring now to FIG. 5 a stuffing box and seal assembly 220 is illustrated including a stuffing box 222 which utilizes the housing 24 and a modified cover 256 having a cylindrical upwardly extending axial hub portion 257 with a suitable bore 259 formed therein of greater diameter than the seal elements 76, 76a and 76b. The cover 256 also includes a roof 64 formed as a surface of a transverse end wall 258 and an axially extending portion 260 which includes threads 62 formed thereon for engagement with cooperating threads 44 formed on the housing 24. The modified cover 256 thus provides protection for spare seal elements 76a and 76b and for replacement slinger rings 308a and 308b which may replace a slinger ring 308 in a manner to be described hereinbelow.

Stuffing box and seal assembly 220 is also operable to provide a seal for shaft 14 which, in turn, is provided with a modified liner or sleeve 316 comprising an elongated tubular member having a suitably hardened and polished outer surface and a cylindrical skirt 320 suitably welded to its upper end. The sleeve 316 includes a cylindrical bore 322 which is slightly larger than the diameter of the shaft 14. The sleeve 316 is retained in its working position by a generally cylindrical head member 324 which includes a bore 326 for retaining an axially split, annular resilient seal element 328 therein. Bore 326 is at least partially threaded at 327 and is threadedly engaged with skirt 320 to releasably connect the sleeve 316 to the head member 324 and to retain seal element 328 in the bore 326. The head member 324 is secured to the shaft 14 for rotation therewith by plural circumferentially spaced set screws 330. The skirt 320 is suitably secured to the sleeve 316, such as by welding at 332, and is retained against rotation with respect to the head member 324 by one or more set screws 334 supported on the head member. A portion of skirt 320 projects below head member 324 for engagement by a wrench for assembly and disassembly of the sleeve 316 with respect to the head member.

When it is desired to move the sleeve 316 to another working position with respect to a seal element 76, the set screws 324 are loosened and the sleeve and head member 324 are moved axially up or down the shaft 14 and the set screws are then re-tightened. The seal element 328 may be replaced by loosening the set screw 334 and threadedly disconnecting the sleeve and skirt assembly from the head member 324 so that the seal element can be replaced to prevent leakage of fluid from the annular space between the shaft 14 and the sleeve 316.

Another advantage of the stuffing box and seal assembly 220 is that, when the seal element 76 requires replacement, the cover 256 may be disconnected from the housing 24 in the same manner as the previous embodiments, the seal elements 76 and 308 cut off of the sleeve 316 and a new seal element such as element 76a and slinger ring 308a moved into working positions, respectively. The process may be repeated when the seal element 76a is worn.

The number of seal elements and slinger rings stored as spares on the shaft 14 or a hard faced shaft sleeve or liner, such as the sleeves 116 or 316, may be predetermined for the expected life or major overhaul interval of the pumping system being operated in conjunction with the stuffing box and seal assembly 20, 120 or 220 so that a split type seal is not required and disassembly of the box from the shaft is also not required in order to replace a worn or damaged seal element.

A suitable loose fitting flexible annular boot or shield, not shown, may be secured to the top portions of the respective stuffing boxes described herein and surrounding the shaft or sleeve to serve as a weather shield.

The components of the stuffing box and seal assemblies 20, 120 and 220 described herein may be made of conventional engineering materials used for rotary shaft seals and stuffing boxes in corrosive as well as non-corrosive environments. Although preferred embodiments of the invention have been described in some detail herein, those skilled in the art will recognize that various substitutions and modifications may be made to the invention without departing from the scope and spirit of the appended claims.

What is claimed is:

1. A stuffing box and seal assembly for forming a substantially fluid-tight seal at a rotary shaft, comprising:

a housing including means for connecting said housing to a support structure, said housing including a bore for receiving a rotary shaft extending therethrough, a first transverse face on said housing and a chamber defined at least in part by said housing;

a cover including a transverse wall portion and a bore extending therethrough for receiving said rotary shaft, said cover including a second transverse face adapted to be opposed to said first transverse face, said cover and said housing including cooperable means for connecting said cover to said housing;

a seal holder disposed in said chamber and including means for supporting a resilient seal element, said seal holder including a third transverse face operable to be opposed to and adjacent to said first transverse face; and a seal retainer operable to be disposed around said rotary shaft and including opposed surfaces thereon engageable with said seal holder and said second transverse face for retaining said seal element in a working position in sealing engagement with said rotary shaft, said seal retainer including opposed parts adapted to be disposed around said rotary shaft and retained between said cover and said seal holder, said parts of said seal retainer being separable one from the other for removing said seal retainer from said rotary shaft to provide for replacing a seal element supported on said seal holder.

2. The stuffing box assembly set forth in claim 1 wherein:

said seal element is disposed in a bore in said seal holder; and said parts of said seal retainer are retained in an assembled position of said seal retainer by a hub portion of said seal retainer which is operable to be disposed in said bore in said seal holder.

3. The stuffing box assembly set forth in claim 1 including:

retaining means supported on said housing and engageable with said seal holder to substantially prevent rotation of said seal holder in said chamber.

4. The stuffing box assembly set forth in claim 3 wherein:

said retaining means comprises at least one pin extendable into a slot formed in said seal holder and said pin is connected to a plug member removably supported on said housing for closing a drain port for said chamber.

5. The stuffing box assembly set forth in claim 1 wherein:

said seal holder includes passage means formed therein between said seal element and said chamber for conducting lubricant and/or coolant fluid from said chamber to said seal element.

6. The stuffing box assembly set forth in claim 1 wherein:

said cover is threadedly engaged with said housing and includes a distal end portion engageable with a surface on said housing to define a limit position of said second transverse face with respect to said first transverse face which permits limited radial excursion of said seal holder and said seal retainer with respect to said housing.

7. The stuffing box assembly set forth in claim 6 wherein:

said seal retainer includes a part engageable with said bore in said cover for limiting the radial excursion of said seal holder and said seal retainer with respect to said housing.

8. The stuffing box assembly set forth in claim 1 including:

a passage formed in said housing and in communication with a space between said housing and said support structure for conducting pressure fluid from said space to the exterior of said housing.

9. The stuffing box assembly set forth in claim 1 including:

seal means supported on one of said seal holder and said housing and forming a substantially fluid-tight seal between said first and third transverse faces.

10. The stuffing box assembly set forth in claim 9 wherein:

said housing includes a circumferential groove formed in said first transverse face, and said seal means comprises a resilient seal ring disposed in said groove and engageable with said third transverse face on said seal holder.

11. The stuffing box assembly set forth in claim 1 wherein:

said seal element is a pressure set resilient seal element engageable with said rotary shaft to substantially prevent pressure fluid from flowing from said support structure to the exterior of said stuffing box assembly.

12. The stuffing box assembly set forth in claim 1 including:

sensing means for sensing a fluid level in said chamber.

13. The stuffing box assembly set forth in claim 1 including:

means forming a dam supported on said shaft and disposed within a recess formed on said seal retainer to minimize flow of fluid along said shaft between said seal element and said bore in said cover.

14. The stuffing box assembly set forth in claim 1 wherein:

said shaft includes a seal engaging sleeve supported thereon and means for adjusting the position of said sleeve with respect to said seal element to provide a substantially unworn sealing surface on said sleeve engageable with said seal element to minimize fluid leakage between said seal element and said shaft.

15. The stuffing box assembly set forth in claim 1 wherein:

said seal retainer and said seal holder include cooperating surfaces engageable with each other to limit the working position of said seal retainer with respect to said seal holder and said seal element to retain said seal element in said seal holder without substantial forcible engagement of said seal element by said seal retainer.

16. The stuffing box assembly set forth in claim 1 including:

at least one spare seal element stored in a non-working position on said shaft and operable, upon disconnecting said cover from said housing and movement of said seal retainer with respect to said shaft, to be moved along said shaft into a working position with respect to said seal holder.

17. The stuffing box assembly set forth in claim 16 wherein:

said seal retainer includes an annular cavity formed therein for storing at least one spare seal element.

18. The stuffing box assembly set forth in claim 16 wherein:

said cover includes a hub portion having a bore formed therein for enclosing said at least one spare seal element on said shaft.

19. The stuffing box assembly set forth in claim 16 including:

at least one spare fluid slinger ring stored on said shaft in a non-working position and operable to be moved into a working position on said shaft and enclosed within an annular recess formed in said seal retainer.

20. A stuffing box and seal assembly for providing a substantially fluid tight seal at a rotary shaft for a downhole well pump, comprising:

a housing including means for connecting said housing to an upper end of a fluid conducting conduit for conducting fluid from a well, said housing including a bore for receiving a rotary shaft extending through said housing and within said conduit, said housing including a first transverse face delimiting a chamber within said housing;

a cover including a transverse end wall and a bore extending therethrough for receiving said rotary shaft, said cover including a second transverse face opposed to said first transverse face and delimiting said chamber, said cover and said housing including cooperating threads formed thereon for connecting said cover to said housing;

a seal holder disposed in said chamber and including a bore for receiving a resilient seal element engageable with said rotary shaft and forming a seal around said shaft to substantially prevent fluid in said conduit from flowing from said conduit to the exterior thereof through said stuffing box assembly, said seal holder including a third transverse face disposed adjacent to said first transverse face;

seal means interposed between said first and third transverse faces and forming a substantially fluid tight seal between said seal holder and said housing to prevent leakage of fluid from said conduit into said chamber;

a spacer member including opposed surfaces thereon engageable with said seal holder and said cover for retaining said seal holder in a working position in said chamber, said spacer member including plural opposed parts operable to be assembled around said rotary shaft when said spacer member is disposed between said cover and said seal holder; and means engageable with said seal holder for retaining said seal holder against substantial rotation with respect to said housing.

21. The stuffing box assembly set forth in claim 20 wherein:

said means for retaining said seal holder against rotation with respect to said housing comprises at least one retaining pin supported on said housing and adapted to project into a slot formed in said seal holder.

22. The stuffing box assembly set forth in claim 20 wherein:

said parts of said spacer member include means forming a hub portion when said parts are disposed opposite each other, said hub portion being operable to be disposed in said bore in said seal holder.

23. The stuffing box assembly set forth in claim 22 wherein:

said spacer member comprises two substantially identical parts each forming half of a generally cylindrical member comprising said spacer member.

24. The stuffing box assembly set forth in claim 22 wherein:

said spacer member includes means forming an annular chamber for storing a spare seal element in a non-working position supported by said shaft.

25. In an apparatus including a rotary shaft extending from a structure within which pressure fluid is to be contained, a stuffing box and seal assembly connected to said structure and operable to form a substantially fluid tight seal at said rotary shaft, said stuffing box and seal assembly including a stuffing box including a housing part and a cover part removably connected to said housing part and adapted to be moved axially away from said housing part along said rotary shaft, a first annular seal element adapted to be supported in said stuffing box to form a fluid tight seal between said first annular seal element and said rotary shaft, a seal retainer adapted to be supported within said stuffing box for retaining said first annular seal element in a working position, and at least a second annular seal element stored in a non-working position on said rotary shaft and operable to be moved into a working position within said stuffing box upon removal of said first annular seal element from said stuffing box without removing said stuffing box from said rotary shaft.

26. The invention set forth in claim 25 wherein:

said second annular seal element is stored on said rotary shaft within said stuffing box.

27. The invention set forth in claim 26 wherein:

said second annular seal element is stored in a cavity form within said seal retainer.

28. The invention set forth in claim 25 including:

a third annular element disposed on said rotary shaft and forming a fluid dam to prevent seal lubricant/coolant from flowing out of said stuffing box, and a fourth annular element disposed on said rotary shaft and operable to be moved along said rotary shaft into a working position in said stuffing box in place of said third element without removing said stuffing box from said rotary shaft.

29. The invention set forth in claim 25 wherein:

said rotary shaft includes a hard surface cylindrical sleeve disposed thereon and engageable with said seal elements in at least their working positions, said sleeve including an elongated annular sleeve member including a portion disposed at one end and engaged with an annular head disposed on said shaft, said head including means for forcibly engaging said shaft to position said sleeve member in a predetermined working position on said shaft, said sleeve member being releasably engageable with said head, and a seal element disposed between said sleeve member and said head to prevent leakage of pressure fluid from said structure.

* * * * *